(12) United States Patent
Abraham et al.

(10) Patent No.: US 8,954,788 B2
(45) Date of Patent: Feb. 10, 2015

(54) METHODS AND STRUCTURE FOR SINGLE ROOT INPUT/OUTPUT VIRTUALIZATION ENHANCEMENT IN PERIPHERAL COMPONENT INTERCONNECT EXPRESS SYSTEMS

(71) Applicant: LSI Corporation, San Jose, CA (US)

(72) Inventors: Moby J. Abraham, Lilburn, GA (US); Parag R. Maharana, Fremont, CA (US)

(73) Assignee: LSI Corporation, Milpitas, CA (US)

( * ) Notice: Subject to any disclaimer, the term of this patent is extended or adjusted under 35 U.S.C. 154(b) by 193 days.

(21) Appl. No.: 13/765,922

(22) Filed: Feb. 13, 2013

(65) Prior Publication Data

US 2014/0229769 A1    Aug. 14, 2014

(51) Int. Cl.
*G06F 11/00* (2006.01)

(52) U.S. Cl.
CPC .................................... *G06F 11/006* (2013.01)
USPC ........................................................ 714/4.5

(58) Field of Classification Search
CPC .................................................. G06F 9/45533
See application file for complete search history.

(56) References Cited

U.S. PATENT DOCUMENTS

7,457,900 B2    11/2008   Panesar
2008/0294808 A1   11/2008   Mahalingam et al.

*Primary Examiner* — Christopher McCarthy
(74) *Attorney, Agent, or Firm* — Duft Bornsen & Fettig LLP (57) ABSTRACT

In one embodiment, a Peripheral Component Interconnect Express (PCIe) Input/Output (I/O) device operable to perform Single Root I/O Virtualization (SR-IOV) is provided. The device comprises hardware registers implementing a PCIe configuration space for the device, and firmware implementing one or more SR-IOV virtual functions that each provide a virtual machine access to a subset of PCIe configuration space hardware registers for the device. The device further includes a hardware recovery register directly accessible by each of the virtual machines, and a control unit. The control unit is operable to detect a firmware fault at the I/O device and to update the hardware recovery register with information describing the firmware fault.

20 Claims, 7 Drawing Sheets

| BITS | CATEGORY | VALUE |
|---|---|---|
| 0 | LOCK | FALSE |
| 1-2 | STATE | READ |
| 3-4 | STATUS | FAILURE |
| 5-8 | DATA | SYSTEM RESET |
| 9-12 | COMMAND | ACK EXPECTED |
| 13-31 | VF IDENTIFIER | VFS 1, 7, 12 |

500

EXEMPLARY SHARED REGISTER

METHODS AND STRUCTURE FOR SINGLE ROOT INPUT/OUTPUT VIRTUALIZATION ENHANCEMENT IN PERIPHERAL COMPONENT INTERCONNECT EXPRESS SYSTEMS

BACKGROUND

1. Field of the Invention

The invention relates generally to virtualization and more specifically relates to Peripheral Component Interconnect Express (PCIe) technologies for enhancing Single Root Input/Output Virtualization (SR-IOV).

2. Discussion of Related Art

SR-IOV is a PCIe technology that is used to implement Input/Output (I/O) virtualization. In virtualized systems, one or more Virtual Machines (VMs) operate on a single physical computing system. Each VM operates on the computing system substantially independently of its peers. For example, each VM may have its own memory space on the physical computing system, and may implement its own Operating System (OS) and associated programs. However, the VMs share the physical resources of the computing system. Thus, one physical computer may be used to host multiple VMs, each performing a different function. This ensures that the processors of the physical computer are effectively utilized to service multiple tasks.

Sharing of physical resources between VMs is typically performed without the knowledge of the VMs. The individual VMs operate as if they have complete control of the physical computing system, and do not normally communicate with each other. Sharing of physical resources between VMs is performed by a Virtual Machine Manager (VMM) (also known as a hypervisor), which implements a hardware abstraction layer between the VMs and the physical resources of the system. Unbeknownst to the VMs, the VMM may prioritize, queue, or otherwise manage the order and manner in which I/O for the VMs is processed by the resources of the physical computing system. The VMM may also set up initial memory spaces for each VM, boot each VM onto the physical computing system, etc. As far as each VM is concerned, it has initialized in an environment where it has its own, dedicated physical computing hardware.

In I/O virtualization, a single I/O hardware device (such as a PCIe RAID adapter or network adapter) is shared between multiple VMs. The sharing can be performed using software (emulated), hardware (e.g., SR-IOV), or hybrid (Paravirtualization) sharing techniques.

Figure 1:
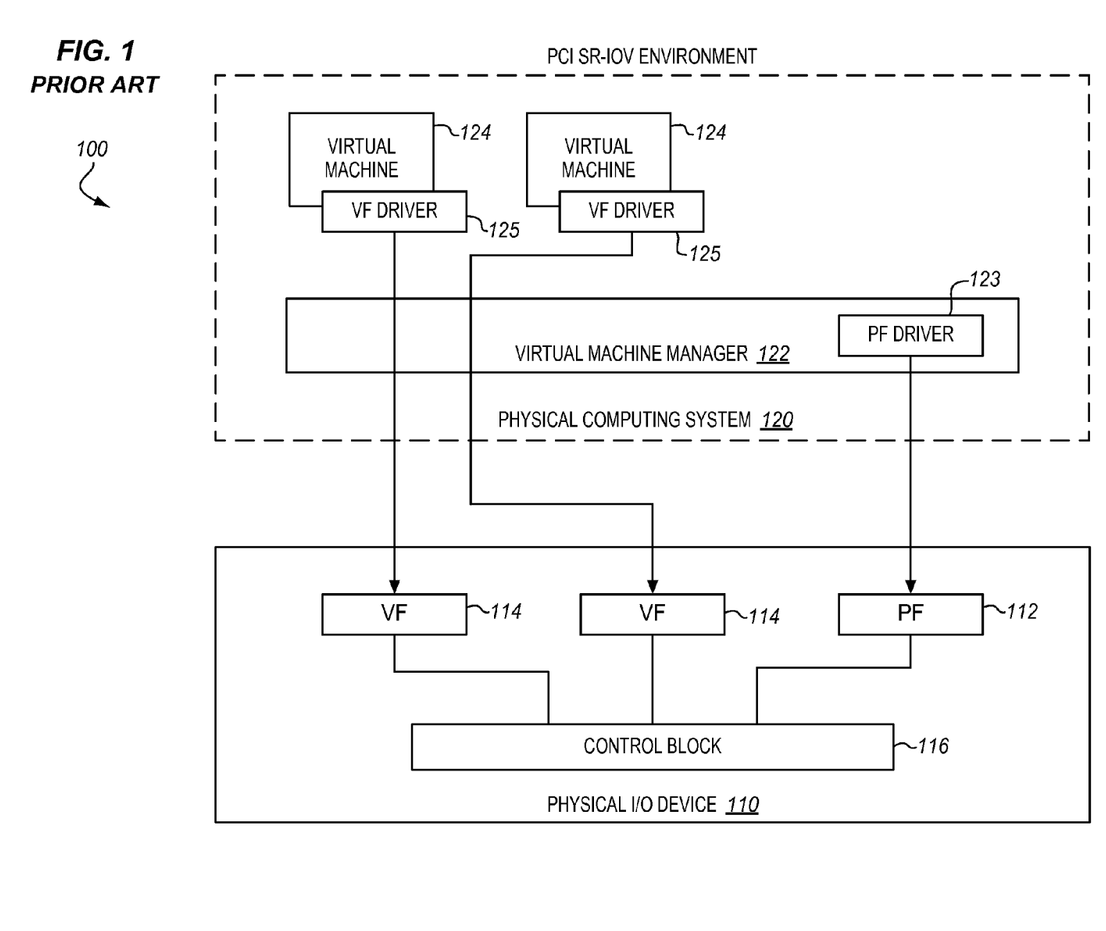
FIG. 1 is a block diagram of an exemplary PCI SR-IOV system.

FIG. 1 illustrates an exemplary SR-IOV system 100, where a physical computing system 120, such as a host, sends I/O to a physical I/O device 110. Physical device 110 uses SR-IOV to implement Physical Function (PF) 112 at a physical I/O device 110, and also to implement multiple Virtual Functions (VFs) 114 at the physical I/O device. PF 112 is hardware circuitry that acts as a standard interface for I/O device 110. PF 112 communicates with a physical function driver 123 at the emulation layer of VMM 122. PF 112 also has access to hardware registers that implement the full PCI configuration space for physical I/O device 110.

In contrast to PF 112, each VF 114 is implemented in firmware as a processor implementing logical instructions. Furthermore, each VF 114 communicates with a virtual function driver 125 of a single VM 124. The virtual function drivers 125 bypass an emulation layer in VMM 122, providing VMs 124 direct access to the VFs 114 of I/O device 110. VFs 114 at physical I/O device 110 receive I/O from virtual function drivers 125. Each VF 114 acts as an independent, virtual port of I/O device 110, and uses hardware registers to implement a limited subset of the PCIe configuration space of physical I/O device 110. This enhances processing quality at control block 116, which performs core control functions for I/O device 110.

The VMM assigns one or more VFs to a VM by mapping configuration space registers of the VFs to the configuration space presented to the VM by the VMM. SR-IOV-capable devices can provide configurable numbers of independent VFs, each with its own PCIe configuration space.

Each VF implements a subset of traditional PCIe configuration space hardware registers, and accesses the remaining configuration space registers via the associated PF. Specifically, a Single Root PCI Manager (SR-PCIM) can intercept attempts by VMs to access configuration space registers that are not a part of the VF, and can use the information from the PF registers to present a complete PCIe configuration space to a guest OS running in a VM.

Unfortunately, when I/O device 110 is first powered on, VFs 114 do not exist inside VMM 222 and they cannot retrieve their hardware registers for the PCIe configuration space. This is also true even for registers that are accessed by VFs 114 via PF 112, because the SR-PCIM (existing in software) will not be available to acquire these registers from PF 112 while the system is still booting. Thus, when a physical I/O device is rebooted, the configuration space of each VF 114 is not available. This can cause errors at each VM 124 that attempts to contact a VF 114, because the VF 114 becomes completely unresponsive to the VM 124. The VM 124 is unable to determine the reason for the lack of responsiveness.

Thus it is an ongoing challenge to enhance interactions between VMs and VFs in a PCI SR-IOV environment.

SUMMARY

The present invention addresses the above and other problems, thereby advancing the state of the useful arts, by providing methods and structure for multiple Virtual Machines (VMs) to share direct access to a physical register of a physical Peripheral Component Interconnect Express (PCIe) Input/Output (I/O) device that implements Single Root I/O Virtualization (SR-IOV).

In one aspect hereof, a Peripheral Component Interconnect Express (PCIe) Input/Output (I/O) device able to perform Single Root I/O Virtualization (SR-IOV) is provided. The device includes hardware registers implementing a PCIe configuration space for the device, and firmware implementing one or more SR-IOV virtual functions that each provide a virtual machine access to a subset of PCIe configuration space hardware registers for the device. The device further includes a hardware recovery register directly accessible by each of the virtual machines, and a control unit. The control unit is able to detect a firmware fault at the I/O device and to update the hardware recovery register with information describing the firmware fault.

Other exemplary embodiments (e.g., methods and computer-readable media relating to the foregoing embodiments) may be described below.

DETAILED DESCRIPTION OF THE DRAWINGS

Figure 2:
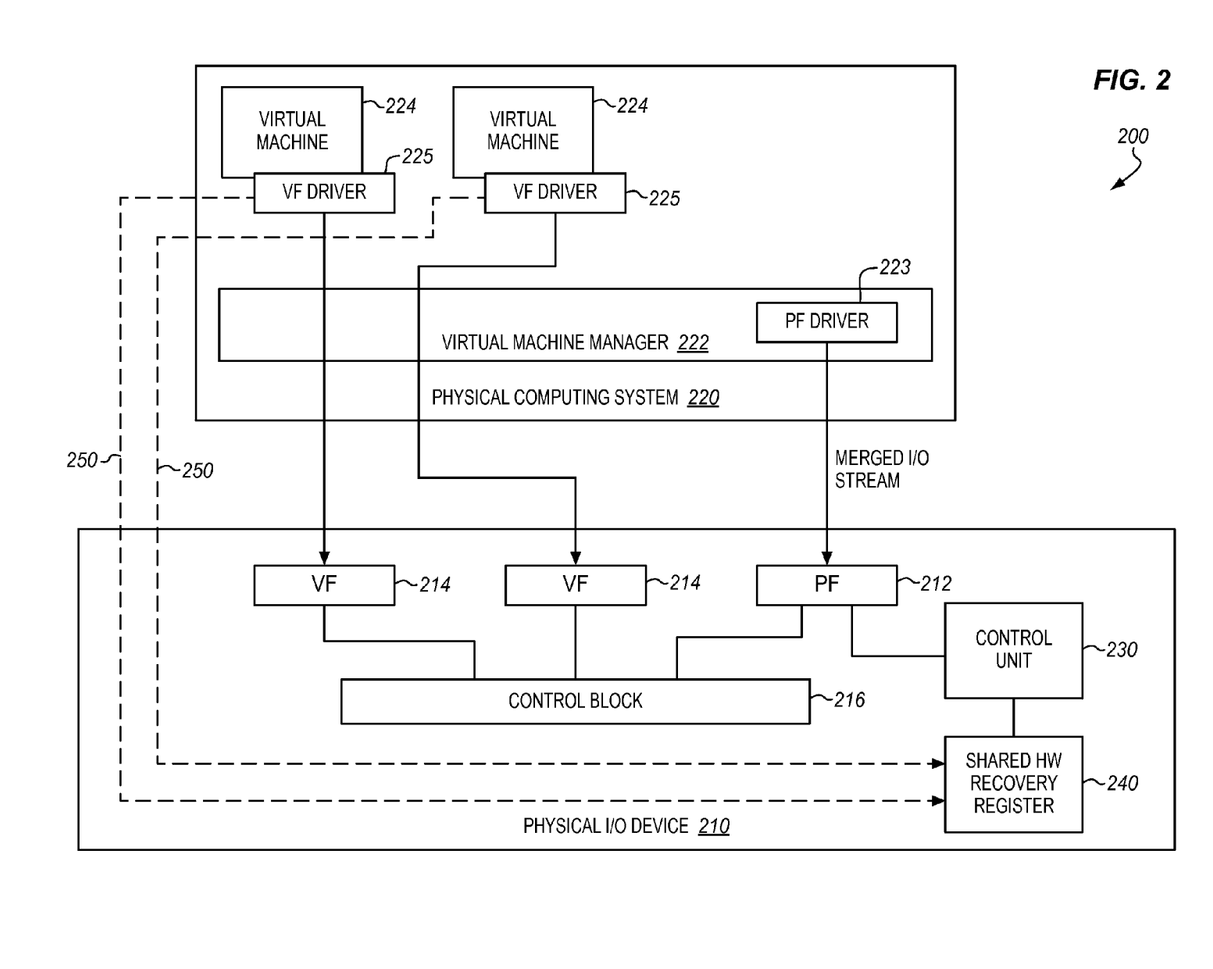
FIG. 2 is a block diagram illustrating an exemplary PCI SR-IOV system enhanced in accordance with features and aspects hereof

FIG. 2 is a block diagram illustrating an exemplary PCI SR-IOV system 200 enhanced in accordance with features and aspects hereof According to FIG. 2, PCI SR-IOV system 200 includes an enhanced physical computing system 220, coupled with an enhanced physical I/O device 210 that utilizes a control block 216 to process I/O. Enhanced physical device 210 includes a shared hardware recovery register 240 that is directly accessible to VF drivers 225 of physical computing system 220. When VF drivers 225 of VMs 224 detect that their corresponding VFs 214 are unavailable, VF drivers 225 have been enhanced to directly access shared hardware recovery register 240 to exchange information with physical I/O device 210. Thus, even when the firmware implementing VFs 214 is rebooting or has otherwise encountered a fault, VMs 224 can be informed of the status of physical device 210. VF drivers 225 access shared hardware recovery register 240 via one or more pathways 250. In one embodiment, VF drivers 225 access register 240 through a standard Base Address Register (BAR). The BAR appears as a normal register. However, the contents of this register are replicated across each VF 214 as well as PF 212 through control logic in control block 216.

Further details of the operations of conventional PCI SR-IOV systems may be understood by referring to the conventional PCI 3.0 specification, issued by the PCI Special Interest Group (PCI-SIG) and herein incorporated by reference, the PCI Express Base Specification 3.0, issued by PCI-SIG and herein incorporated by reference, and also the PCI SR-IOV 1.1 specification, issued by PCI-SIG on Jan. 20, 2010 and herein incorporated by reference.

Physical computing system 220 implements one or more processors and memories in order to operate VMs 224. Here, VMs 224 each utilize their own VF driver 225 to communicate with a corresponding VF 214. Each VF driver 225 comprises a set of instructions for directly interacting with a corresponding VF 214 of physical I/O device 210. In contrast, PF 212 is contacted via PF driver 223, which is implemented at VMM 222.

Physical I/O device 210 may comprise a Network Interface Controller (NIC), RAID Storage Controller or other PCIe I/O adapter component. Physical I/O device 210 includes hardware registers, which store PCIe configuration space data for device 210. A full set of PCIe configuration space hardware registers is accessible to PF 212. In contrast, VFs 214 each implement only a subset of PCIe configuration space registers. The remaining configuration space registers that are not implemented by VFs 214 are normally accessed via an SR-PCIM that accesses the registers of PF 212.

The hardware registers of I/O device 210 cannot be accessed directly by VMs 224. Instead, according to SR-IOV standards, VMs 224 access PCIe configuration space registers via firmware VFs 214.

Because VFs 214 and the SR-PCIM are implemented by firmware at physical I/O device 210, whenever a firmware fault is encountered (e.g., from an error or a reset of device 210), VFs 214 would normally become unresponsive. Meanwhile, PF 212 remains operable because it is implemented by hardware circuitry.

In order to address this issue, VF drivers 225 each are able to access an alternate pathway 250 that provides them with direct access to a shared hardware register 240. This alternate pathway does not utilize firmware, but rather utilizes a direct physical signaling pathway. Therefore, alternate pathway 250 can be accessed directly by VF drivers 225 (e.g., from each PF and VF level). In this manner, by checking shared hardware register 240, a VM 224 can determine the status of I/O device 210.

Physical I/O device 210 further includes control unit 230. Control unit 230 may update the contents of shared hardware recovery register 240 in order to indicate the status of I/O device 210. Control unit 230 may be implemented as hardware circuitry or other non-firmware embodiments. In one embodiment, control unit 230 is integrated as a circuitry component of PF 212. Shared hardware recovery register 240 itself may be shared, for example, through Host Bus Adapter (HBA) hardware of I/O device 210.

By altering shared hardware register 240, VF drivers 225 may, in substance, submit queries to control unit 230. Control unit 230 may then update shared hardware register 240 to generate a response. Such queries and responses may indicate that a VM 224 has detected an error at I/O device 210, may indicate to VMs 224 that I/O device 210 is rebooting, may indicate that a VF is currently undergoing a Function Level Reset (FLR), etc.

Note that the particular arrangement of components described herein is merely intended to be exemplary, and one of ordinary skill in the art will appreciate that the specific arrangement and configuration of PCI systems is merely a matter of design choice.

Figure 3:
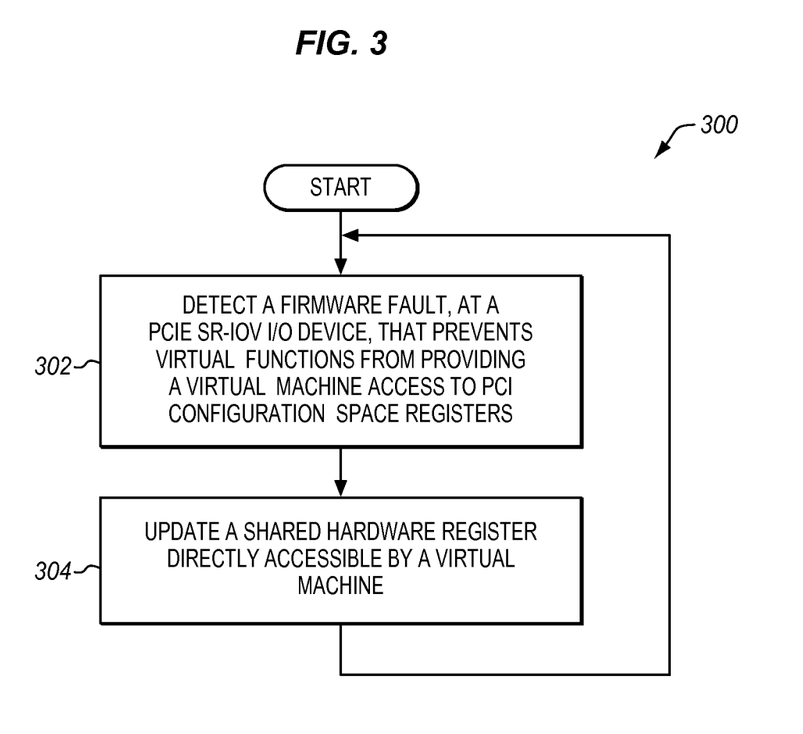
FIG. 3 is a flowchart describing an exemplary method in accordance with features and aspects hereof to operate an enhanced PCI SR-IOV system.

FIG. 3 is a flowchart describing an exemplary method 300 in accordance with features and aspects hereof to operate an enhanced PCI SR-IOV system. The method of FIG. 3 may be operable in an SR-IOV system such as described above with regard to FIG. 2. The steps of the flowcharts described herein are not all inclusive and may include other steps not shown. The steps described herein may also be performed in an alternative order.

Step 302 comprises detecting a firmware fault at a PCIe I/O device implementing SR-IOV. The firmware fault causes some or all of the firmware at the PCIe device (which are implemented in firmware) to stop functioning. Thus, the VFs of the I/O device become unresponsive to queries from the VMs that they are associated with. A firmware fault comprises any condition that causes one or more VFs to become unavailable. For example, a firmware fault may include a reboot, an ongoing firmware update, a hard or soft "crash," a Function Level Reset (FLR) of a VF, an exception, and/or other conditions. The firmware fault may be detected by a control unit at the PCIe device, such as an integrated component of a PF at the PCIe device. The firmware fault need not cause every VF to become non-responsive, so long as it causes at least one VF to become non-responsive. In one embodiment, a firmware fault is detected when a PF driver determines that firmware in the PCIe I/O device is in a fault state, when firmware at the PCIe I/O device sends an "async" event notification to reset the adapter, or when a regularly timed "heartbeat signal" between the PF driver and the firmware of the PCIe I/O device is not received.

In step 304, the PCIe I/O device updates a shared hardware recovery register that is directly accessible by a VM (such as a virtual function driver component of a VM). The shared hardware register may include a field to describe the nature of the fault with a tag or other code, and may further indicate a field that shows the estimated amount of firmware down-time resulting from the fault. For example, the hardware register may indicate that the firmware for the entire I/O device is being updated, and the firmware will be down for five minutes.

Once the hardware register has been updated in this manner, one or more VMs access the register via a dedicated pathway. The VMs themselves may have full read/write access to one or more fields of the register, may have only read access to certain parts of the register, etc. Further details of how VMs may access the shared register are described below with regard to FIG. 4.

Figure 4:
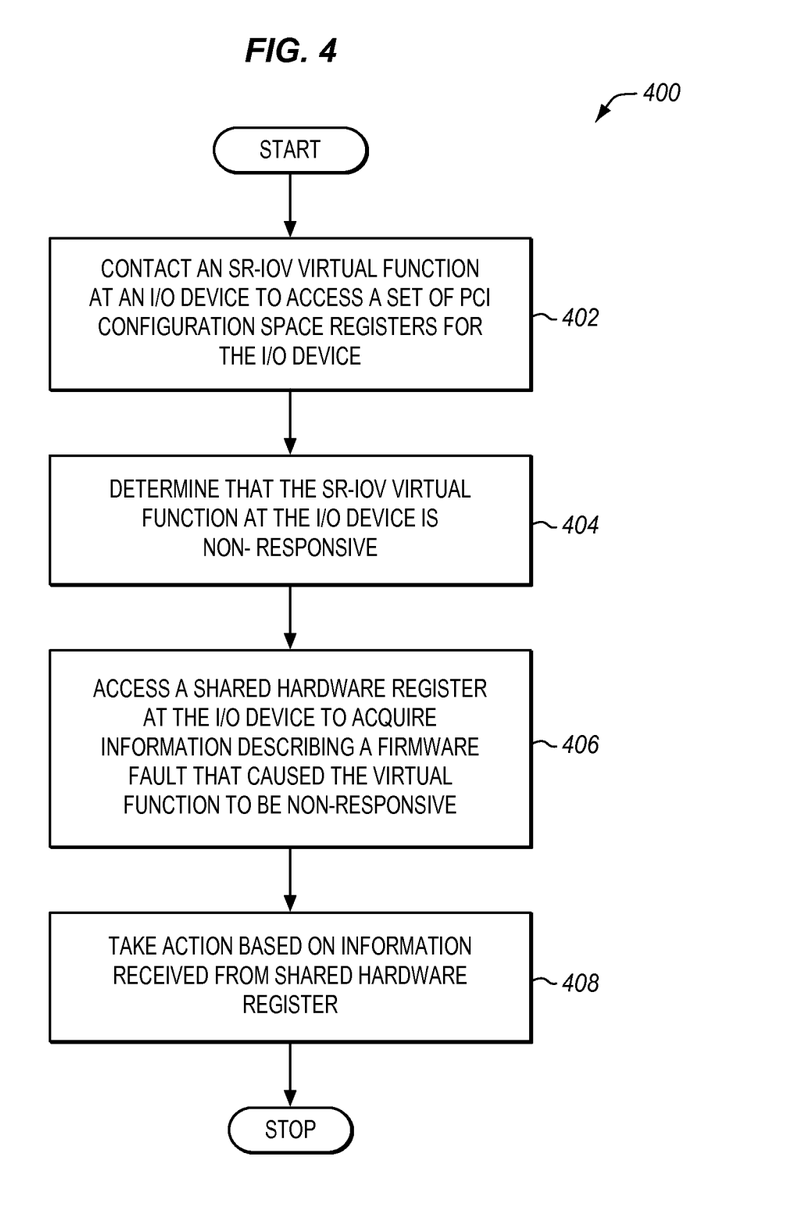
FIG. 4 is a flowchart describing an exemplary method in accordance with features and aspects hereof to operate an enhanced virtual machine in a PCI SR-IOV system.

FIG. 4 is a flowchart describing an exemplary method 400 in accordance with features and aspects hereof to operate an enhanced VM in a PCI SR-IOV system. FIG. 4 illustrates how one or more VMs may access a shared hardware register at a PCIe I/O device that implements SR-IOV in order to determine why/how a VF at the I/O device is non-responsive.

In step 402, the VM attempts to contact an SR-IOV VF at the I/O device in order to access a set of PCI configuration space registers for the I/O device. This may be performed in accordance with existing SR-IOV techniques. For example, the VM may utilize a VF driver to send messaging to the VF.

In step 404, the virtual machine determines that the VF is non-responsive. This may be determined when a response from the VF times out, when the VF provides an unexpected or unintelligible response, or when messaging quality from the VF (e.g., latency, throughput, etc.) drops below a certain threshold.

In step 406, the virtual machine accesses a shared hardware register at the PCIe I/O device that implements the VF. Because firmware for the I/O device has encountered a fault, in one embodiment the access is performed via a solely hardware signaling pathway within the I/O device. However, in embodiments wherein one portion of firmware at the I/O device encounters a fault while the other portion of firmware remains operable (e.g., during an FLR implemented for a VF while other VFs remain in operation), it may be possible to access the register via a firmware intermediary.

As a part of the access, the VM acquires information from the register describing the firmware fault that caused the VF to be non-responsive. This information may describe the cause of the fault, the nature of the fault, the duration of downtime caused by the fault, and any other suitable pieces of information. Thus, each VM dealing with a non-responsive VF may quickly determine a way to deal with the issue. For example, a VM may decide to wait a period of time before sending any more I/O to its corresponding VF.

In step 408, the VM takes action based on the information received from the shared hardware register. For example, the VM may update the shared register to send a request to the PF. The request may, for example, ask that the physical I/O device be re-booted.

Figure 5:
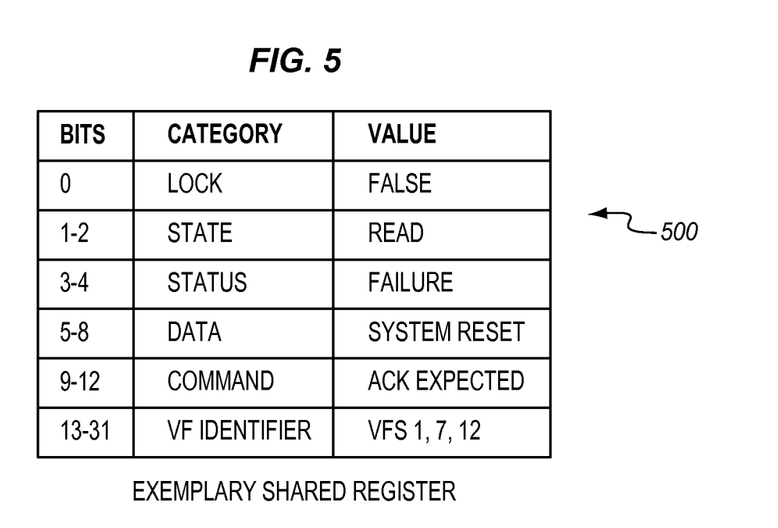
FIG. 5 is a block diagram illustrating an exemplary shared hardware register in accordance with features and aspects hereof

FIG. 5 is a block diagram illustrating an exemplary shared hardware register 500 in accordance with features and aspects hereof. In this embodiment, hardware register 500 comprises a 32 bit scratchpad register. According to FIG. 5, register 500 includes multiple fields that are each composed of one or more bits. For example, register 500 includes a category for lock, state, status, data, command, and VF identifier. Using register 500, VMs may write commands or queries that can be read by an I/O device. In this way, the VMs and the physical I/O device can communicate status information back-and-forth, even though firmware on the I/O device is not operating.

Register 500 can be manipulated by any virtual machine, unless the lock bit is set. If the lock bit is set, then a control unit and/or PF of the I/O device implementing the register can enable write access to register 500 by any suitable combination of VMs.

When a VM writes to register 500, it may write the contents of an entire query/command to register 500. For example, if a VM detects that its corresponding VF is non-responsive or performing poorly, the VM may update register 500 with a command requesting more information on the problem.

A control unit of the I/O device may periodically review the register for commands from VMs, and may update the register to respond to the command. For example, the control unit may use the state field of register 500 to indicate the state of the command (e.g., whether the command is currently in progress). Exemplary states are "done," "free," "in progress," "fault," etc. The status field indicates whether the command has succeeded or failed after reaching the "done" state. When the state is currently in progress, the status field is not reviewed. The data field includes information further describing how the command was performed, any issues encountered in performing the command, etc. The command field may indicate the type of the command requested, and may do so by using an Operational Code (opcode) if desired. The VF identifier indicates the VFs (and therefore VMs) that the information in the register applies to. For example, the VF identifier may indicate that the information in the register is intended for a specific VF (and associated VM). In one embodiment, the VF identifier indicates which VFs (and associated VMs) have write and/or read access to register 500. For example, the VF identifier field could be a bitmap mask indicating which individual VFs are allowed or not allowed to read/write to register 500. Note that the size, nature, and number of parameters discussed above for register 500 are merely exemplary and may vary as a matter of design choice.

Figure 6:
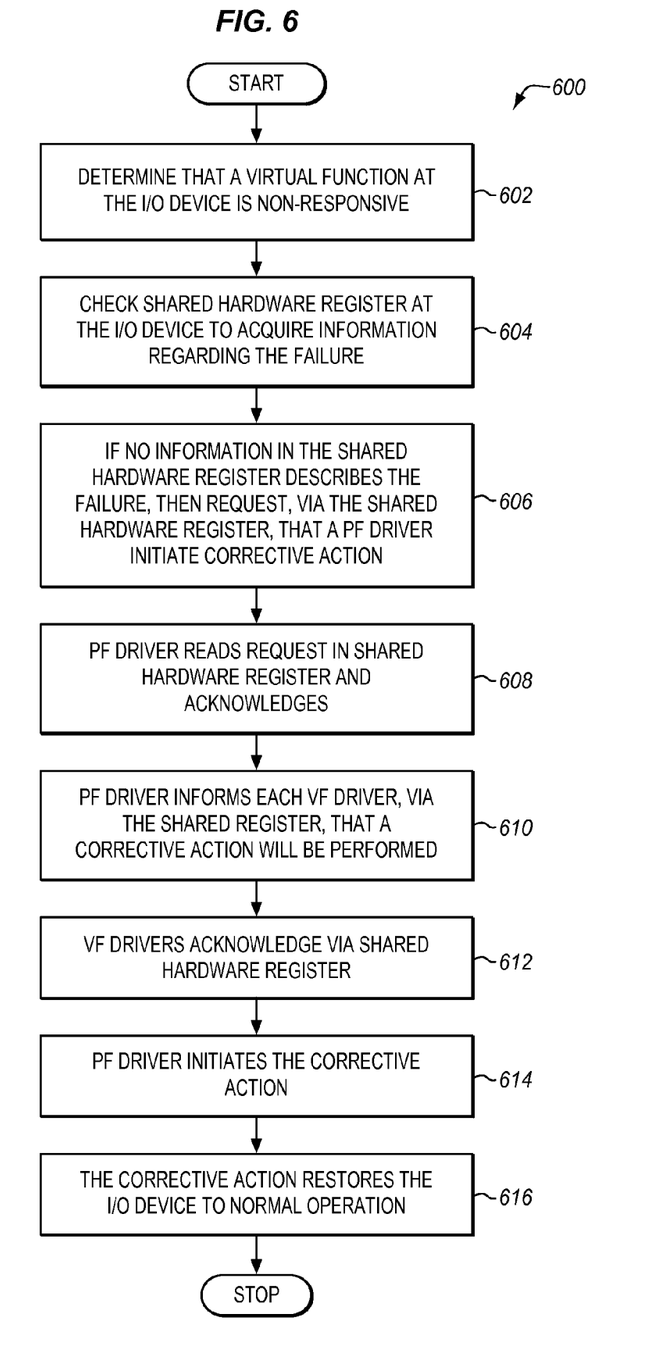
FIG. 6 is a further flowchart describing an exemplary method in accordance with features and aspects hereof to operate an enhanced virtual machine in a PCI SR-IOV system.

Using the shared register described above, VF drivers may communicate with VFs and/or PFs to indicate status information or to provide requests. FIG. 6 is a flowchart illustrating such communications. For example, if a VM determines that a VF has become unresponsive in step 602, and the corresponding VF driver cannot identify a reason for the unresponsive nature of the VF after consulting the shared register in steps 604, it may modify the register in order to request that the PF reboot the I/O device implementing the non-responsive VF IN STEP 606. The PF driver, which periodically checks the register in step 608, may then update the shared register to indicate to all VMs that the I/O device will be rebooting shortly in step 610. The VMs may then use the VF drivers to update the register to indicate an acknowledgment to the PF driver in step 612 before the I/O device is actually rebooted by the PF driver in steps 612 and 614.

Figure 7:
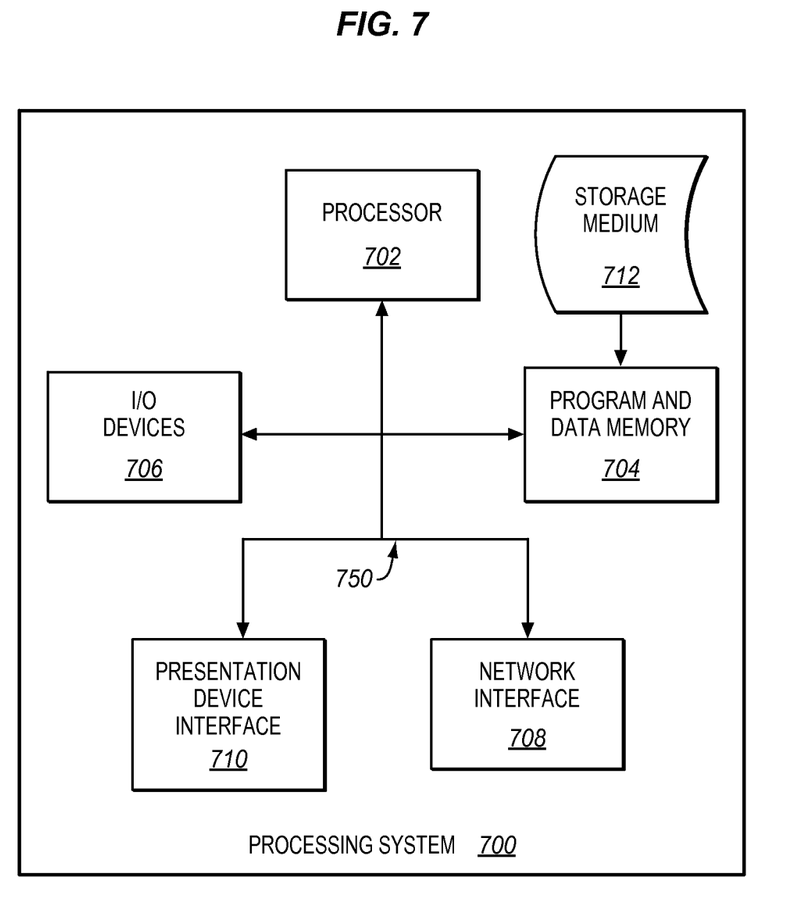
FIG. 7 illustrates an exemplary processing system operable to execute programmed instructions embodied on a computer readable medium to perform desired functions in an exemplary embodiment.

Embodiments disclosed herein can take the form of software, hardware, firmware, or various combinations thereof. In one particular embodiment, physical system 220 of FIG. 2 comprises the various components illustrated and described in FIG. 6 to implement one or more VMs. FIG. 7 illustrates a processing system 700 operable to execute a computer readable medium embodying programmed instructions to perform desired functions in an exemplary embodiment. Processing system 700 is operable to perform the above operations by executing programmed instructions tangibly embodied on computer readable storage medium 712. In this regard, embodiments of the invention can take the form of a computer program accessible via computer-readable medium 712 providing program code for use by a computer or any other instruction execution system. For the purposes of this description, computer readable storage medium 712 can be anything that can contain or store the program for use by the computer.

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 700, being suitable for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 may also be integrated with the system to enable processing system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 710 may be integrated with the system to interface to one or more presentation devices, such as printing systems and displays for presentation of presentation data generated by processor 702.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A Peripheral Component Interconnect Express (PCIe) Input/Output (I/O) device operable to perform Single Root I/O Virtualization (SR-IOV), the device comprising:
hardware registers implementing a PCIe configuration space for the device;
firmware implementing one or more SR-IOV virtual functions that each provide a virtual machine access to a subset of PCIe configuration space hardware registers for the device;
a hardware recovery register directly accessible by each of the virtual machines; and
a control unit operable to detect a firmware fault at the I/O device and to update the hardware recovery register with information describing the firmware fault.

2. The PCIe device of claim 1 wherein:
the firmware fault comprises a reset of the PCIe I/O device.

3. The PCIe device of claim 2 wherein:
the control unit is further operable to determine an estimated time for the PCIe device to complete the reset, and to update the hardware recovery register to indicate this time.

4. The PCIe device of claim 1 wherein:
the control unit is further operable to detect that the firmware fault results from Function Level Reset (FLR) of a virtual function, and to update the hardware recovery register to indicate that the firmware fault results from the FLR.

5. The PCIe device of claim 1 wherein:
the control unit is further operable to determine that a virtual machine has altered the hardware recovery register to query the PCIe device, to determine the nature of the query, and to update the hardware recovery register in order to answer the query from the virtual machine.

6. The PCIe device of claim 5 wherein:
the hardware recovery register includes a bitmap mask that comprises a bit for each virtual machine, and the control unit is further operable to update the bitmap when answering the query.

7. The PCIe device of claim 1 wherein:
the control unit comprises an SR-IOV physical function of the PCIe device.

8. The PCIe device of claim 1 wherein:
the control unit is further operable to periodically review the hardware recovery register, to determine that the hardware recovery register has been updated by a virtual machine to indicate an error at the PCIe device, and to reboot the PCIe device responsive to making the determination.

9. The PCIe device of claim 1 wherein:
the hardware recovery register includes a lock field, and the PCIe device is operable to prevent write access to the shared hardware register by one or more of the virtual machines when one or more bits of the lock field have been set.

10. The PCIe device of claim 1 wherein:
the hardware recovery register may be accessed by the virtual machines without utilizing firmware at the PCIe device.

11. A method for operating a Peripheral Component Interconnect Express (PCIe) Input/Output (I/O) device to perform Single Root I/O Virtualization (SR-IOV), the method comprising:
detecting a firmware fault at the I/O device that prevents SR-IOV virtual functions at the I/O device from providing virtual machines access to a subset of PCIe configuration space hardware registers of the I/O device; and
updating a hardware recovery register directly accessible by the virtual machines with information describing the firmware fault.

12. The method of claim 11 wherein:
the firmware fault comprises a reset of the PCIe I/O device.

13. The method of claim 12 further comprising:
determining an estimated time for the PCIe device to complete the reset; and
updating the hardware recovery register to indicate this time.

14. The method of claim 11 further comprising:
detecting that the firmware fault results from Function Level Reset (FLR) of a virtual function; and
updating the hardware recovery register to indicate that the firmware fault results from the FLR.

15. The method of claim 11 further comprising:
determining that a virtual machine has altered the hardware recovery register to query the PCIe device;
determining the nature of the query; and
updating the hardware recovery register in order to answer the query from the virtual machine.

16. The method of claim 15 wherein:
the shared hardware register includes a bitmap mask that comprises a bit for each virtual machine, and the method further comprises updating the bitmap when answering the query.

17. The PCIe device of claim 1 further comprising:
periodically reviewing the hardware recovery register;
determining that the hardware recovery register has been updated by a virtual machine to indicate an error at the PCIe device; and
rebooting the PCIe device responsive to making the determination.

18. A non-transitory computer readable medium embodying programmed instructions which, when executed by a processor, are operable for performing a method of operating a virtual machine in a Peripheral Component Interconnect Express (PCIe) physical computing system that implements Single Root Input/Output (I/O) Virtualization (SR-IOV), the method comprising:
contacting, via the virtual machine, an SR-IOV virtual function at an I/O device to access a set of PCIe configuration space registers for the I/O device;
determining at the virtual machine that the SR-IOV virtual function at the I/O device is non-responsive; and
accessing, via the virtual machine, a hardware recovery register at the I/O device to acquire information describing a firmware fault that caused the virtual function to be non-responsive.

19. The medium of claim 18 wherein:
the firmware fault comprises a reset of the PCIe I/O device.

20. The medium of claim 19, the method further comprising:
determining an estimated time for the PCIe device to complete the reset; and
updating the hardware recovery register to indicate this time.

* * * * *